United States Patent [19]

Zodrow

[11] 4,430,141

[45] Feb. 7, 1984

[54] MACHINE FOR LABELING OBJECTS, ESPECIALLY BOTTLES

[75] Inventor: Rudolf Zodrow, Dusseldorf, Fed. Rep. of Germany

[73] Assignee: Jagenberg Werke AG, Dusseldorf, Fed. Rep. of Germany

[21] Appl. No.: 499,414

[22] Filed: Jun. 1, 1983

Related U.S. Application Data

[63] Continuation of Ser. No. 276,407, Jun. 22, 1981, abandoned.

[30] Foreign Application Priority Data

Jun. 27, 1980 [DE] Fed. Rep. of Germany ....... 3024164

[51] Int. Cl.³ ..................... B32B 31/00; G05G 15/00; B29C 17/00

[52] U.S. Cl. .................................... 156/360; 156/458; 156/475; 156/DIG. 27

[58] Field of Search ............... 156/360, 215, 458, 363, 156/364, 358, 449, 456, 475, 539, 568, 571, 542, 582, 362, DIG. 27, DIG. 18, DIG. 26, DIG. 30, DIG. 11, DIG. 12, DIG. 13, DIG. 25

[56] References Cited

U.S. PATENT DOCUMENTS

| | | | |
|---|---|---|---|
| 3,540,968 | 11/1970 | White | 156/475 |
| 4,040,887 | 8/1977 | Zodrow | 156/DIG. 11 |
| 4,162,181 | 7/1979 | Zodrow | 156/571 |
| 4,253,904 | 3/1981 | Jodrey et al. | 156/542 |
| 4,300,974 | 11/1981 | Bauer | 156/361 |
| 4,300,975 | 11/1981 | Scott | 156/542 |

*Primary Examiner*—Edward C. Kimlin
*Assistant Examiner*—Louis Falasco
*Attorney, Agent, or Firm*—Sprung, Horn, Kramer & Woods

[57] ABSTRACT

In a labelling machine for objects such as bottles, comprising a bottle carrier having turntables for the bottles, a support, label pick-up elements on said support, a label gripper cylinder with transfer members, drive means coupling the support and the gripper cylinder so as to drive the pick-up elements successively past a glue roller, label stack and the gripper cylinder, and means for rotating each turntable comprising a stationary or fixed cam groove 30, 31 and a cam follower 24,25 so that during transfer of a label from the gripper cylinder to a bottle there is substantial synchronism between the transfer members of the gripper cylinder and the bottle areas to which the labels are to be applied, the improvement wherein the stationary cam in the area of the gripper cylinder contains a second cam 26, 27 which is exchangeable with another cam 39 or which is displaceable by a control means 32-38 such that upon entry and departure of the cam follower into or out of the second cam, the second cam merges with the stationary cam, whereby the machine can readily be adjusted to handle bottles of different radius and/or labels of different size.

10 Claims, 8 Drawing Figures

Figure 1:
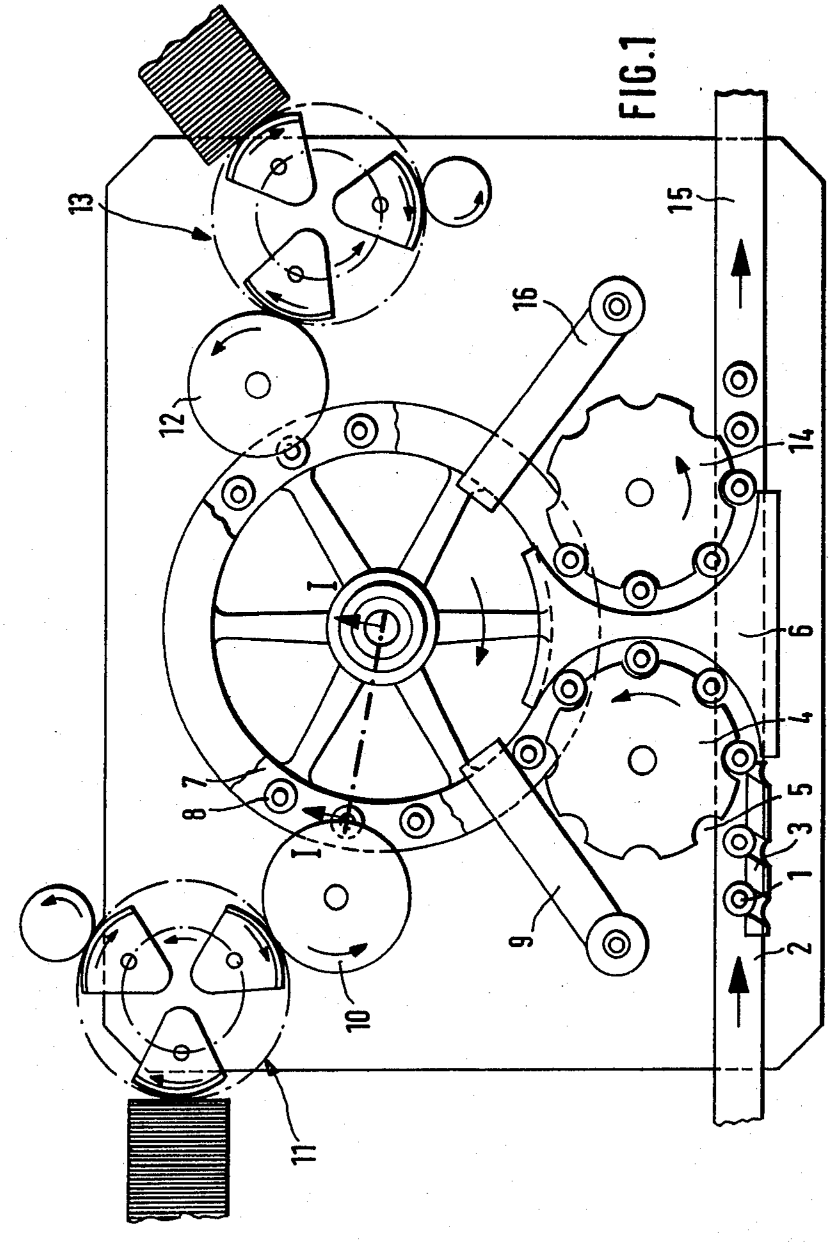

32
37
34
36
35
33
8
19
30
24
25
26
3b
3b
38
28

MACHINE FOR LABELING OBJECTS, ESPECIALLY BOTTLES

BACKGROUND

The invention relates to a labeling machine for objects, especially bottles, which are transported on the turntables of a bottle carrier past a label gripping cylinder coupled rigidly with a carrier for label pickup elements which are operated by a cam drive and roll against various means such as glue rollers, label stacks and label gripping cylinders, the objects or bottles being thus provided with the labels picked up by the pickup elements, each turntable being rotated by a cam follower guided in a stationary cam groove such that, upon the transfer of the label from the gripper cylinder to the bottles, synchronism substantially exists between the label grippers of the gripper cylinder and the areas of the bottles to which the labels are to be applied.

For a perfect labeling of the bodies it is necessary not only that the labels be taken by the pickup elements from the label stack in a rolling action and be transferred to the gripper cylinder in synchronism therewith, but also that the gripper cylinder transfer the labels synchronously to the areas of the bottles to which the labels are to be applied. If the bottles are transported on an arcuate path, then synchronism of the gripper cylinder obtains only for a selected radius of the bottles being labeled. Slight departures from synchronization, which result when the bottle size is changed, or when labels are to be applied on the one hand to the body of the bottle and on the other to the shoulder or neck area thereof, can be compensated more or less well by the pressing elements of the gripper cylinder on the basis of their pliability. Provision has to be made, however, for greater departures from synchronism.

In a known labeling machine of the kind described above, synchronism between the bottles on a bottle carrier of small division and a gripper cylinder of larger division is achieved by making the path velocity of the bottle carrier lower than the path velocity of the gripper cylinder, but on the other hand the bottles are rotated on their own axis by a cam control such that the sum of the path velocity of the areas of the bottles to which the labels are to be applied and the circumferential velocity produced by the rotation of the bottles in the areas to which the labels are to be applied is equal to the path velocity of the label grippers of the gripper cylinder. In this labeling machine no provision can be made for a changeover to a different bottle format or a different division.

Also, a bottle carrier is known in which the turntables can be turned in one sense of rotation by a cam control with a greater or lesser angular velocity. The turning control consists of a cam and cam follower. Individual sections of the cam are replaceable in order to obtain a variety of rotatory movements.

THE INVENTION

The invention has as its purpose to create an object labeling machine which enables the operator to optimize synchronization in a simple manner.

This purpose is accomplished in a labeling machine of the kind described above in that the stationary cam adjacent the gripper cylinder contains a cam section which is exchangeable with a corresponding cam section of a different configuration, or which is displaceable by a control means such that at least when the cam follower enters and leaves the cam section, its curve merges with that of the fixed cam.

The labeling machine of the invention makes it unnecessary to completely replace the control cam in case of departures from the synchronous condition. If synchronism exists between the gripper cylinder and one particular bottle format, it is not necessary to change the division and the transmission ratio between gripper cylinder and bottle carrier for a bottle format differing slightly therefrom, or for a changeover from the labeling of the bottle body to the labeling of the shoulder or neck of the bottle. The slight modification of the synchronization can be achieved by changing or shifting the cam section so as to cause the turntables to turn forward or backward about their own axes according to the modification that is involved.

Preferably, the fixed cam section and the replaceable cam section are of such a configuration in the area of the cam groove junctions that the cam follower applies no force to the turntable at those areas. In this arrangement, the replaceable cam section fits optimally into the fixed cam section, even after long operation and frequent changes or shifting, since the transitions between the fixed cam section and the stationary cam section are not stressed by the turntable rotating action. The purpose of these transitions is only to lead the cam follower out of the one cam section into the other cam section.

The labeling machine of the invention can also be optimized in a simple manner for different label lengths. It offers the possibility of presetting for a different label length. To offer the user this possibility, a further development of the invention provides that the gripper cylinder is interchangeable with a different gripper cylinder of smaller or larger division, the transmission rigidly coupling the carrier of the pickup elements to the gripper cylinder is interchangeable with a different transmission having a higher or lower transmission ratio, and the cam drive of the pickup elements is interchangeable with a cam drive of a different cam configuration, especially by the replacement of its cam section adjacent the gripper cylinder.

An especially simple and easily practiced method of changing the cam sections can be provided by disposing a plurality of different cam sections on a common carrier mounted in the machine frame such that, by turning the carrier, a section can be removed from the cam and a different section can be inserted into the cam. Preferably, the carrier is in the form of a drum or disk which can be turned and locked. If this carrier has a fixed mounting, the replacement of the cam sections is easy for the operator to perform, especially if each turntable with its cam follower is in the form of a unit which can be inserted by lowering it into the machine frame, especially one mounted in a well in the housing. In this case, the operator need only lift up the unit, turn the carrier with the cam sections, and lower the unit again, so that the cam follower re-engages the cam.

In cases in which the cam section is displaceable rather than replaceable for the achievement of a peculiar rotation of the turntable, it is possible with one and the same cam section and one and the same drive for the control means to introduce different rotatory movements into the turntable, provided that a variable-ratio linkage is disposed between the control means drive and the cam section.

The variability of this variable-ratio linkage makes possible the setting of these various rotatory movements.

The drive of the control means consists preferably of a cam turning with the bottle carrier, and acting on a lever engaging the cam section.

According to a further development, the cam section is connected to the lever by a link which can be attached to the lever at different points along its length so as to achieve different throws.

To assure the smooth leading of the cam follower out of the stationary cam into the displaceable cam and vice-versa at different linkage ratios, the points along the linkage lever are situated, according to a further development of the invention, on a circle centered at the point of attachment of the link to the displaceable cam section.

Figure 2:
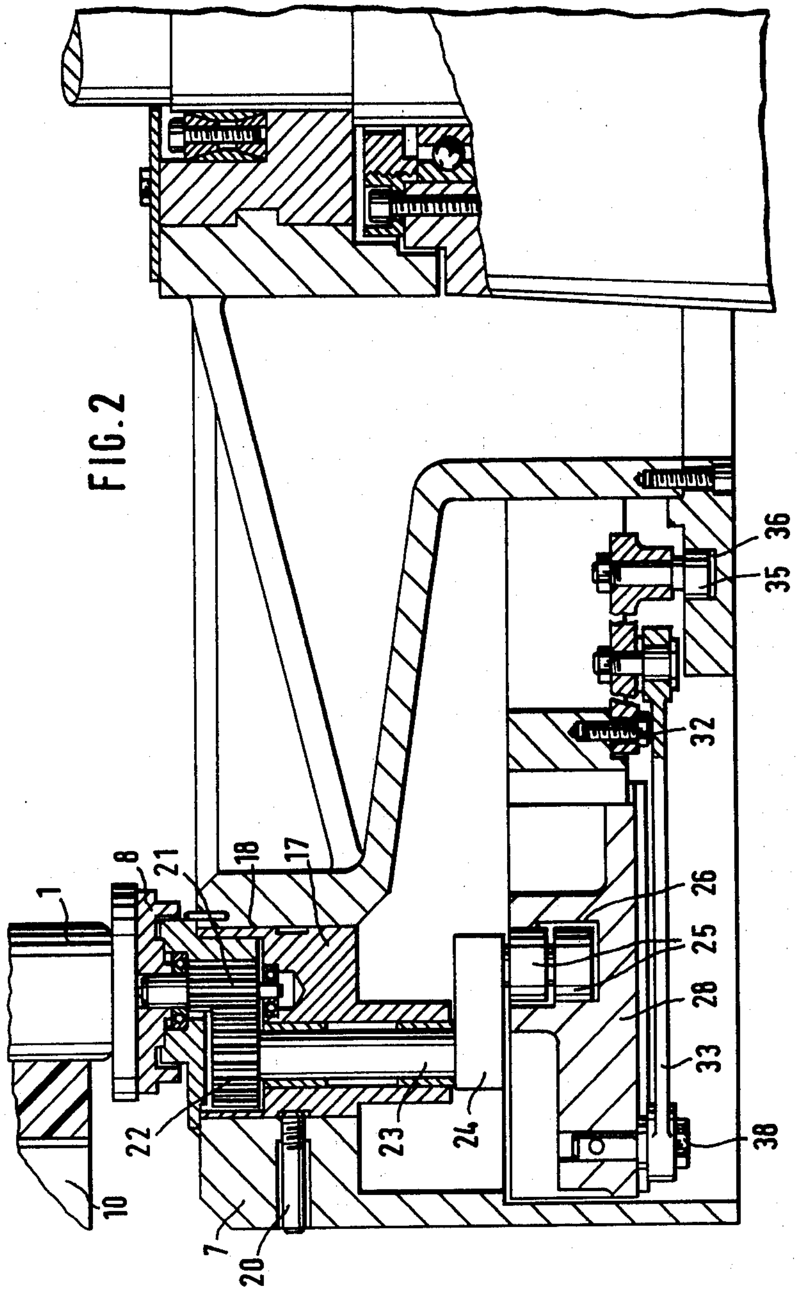
Figures 3, 3A, 3B:
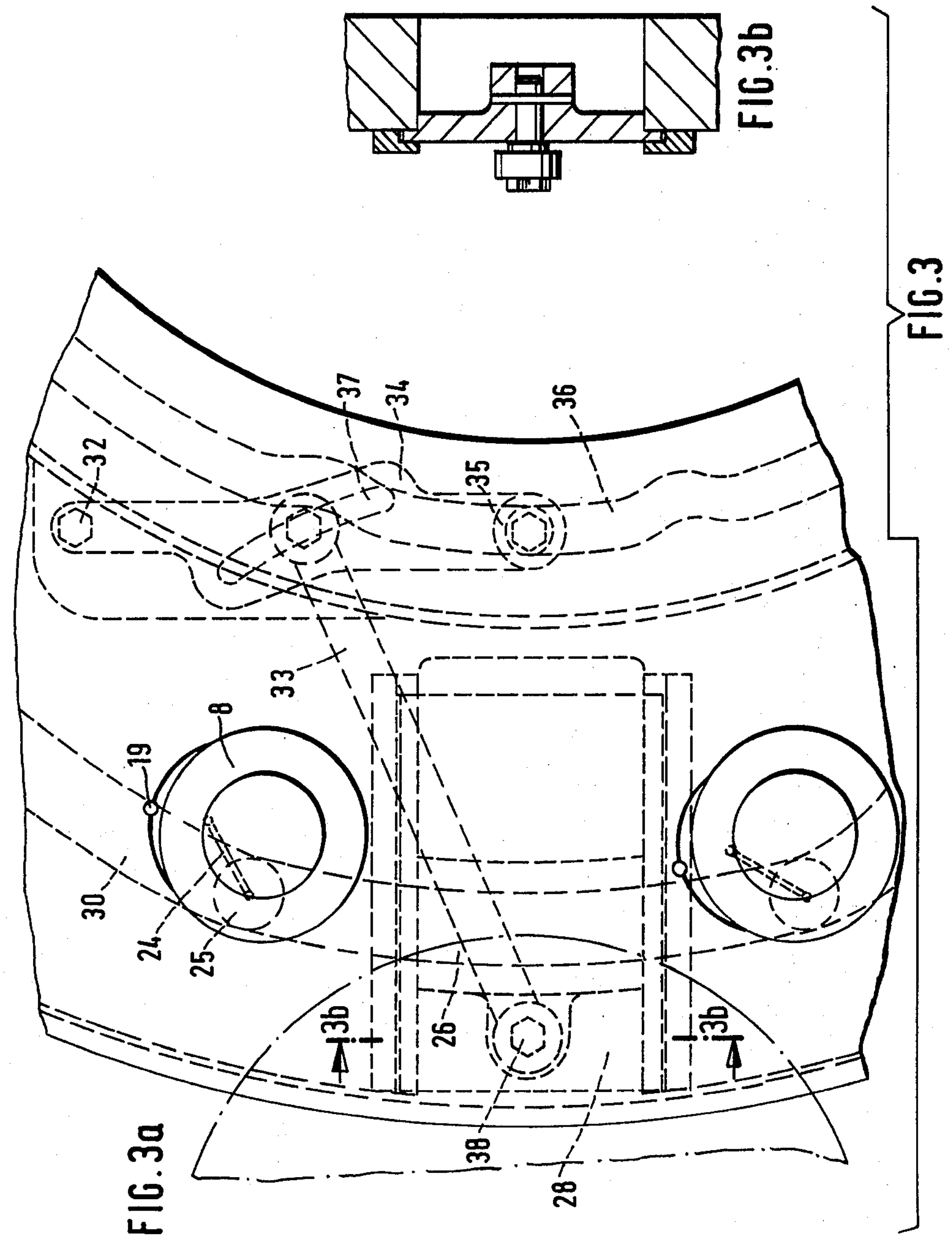
Figure 4:
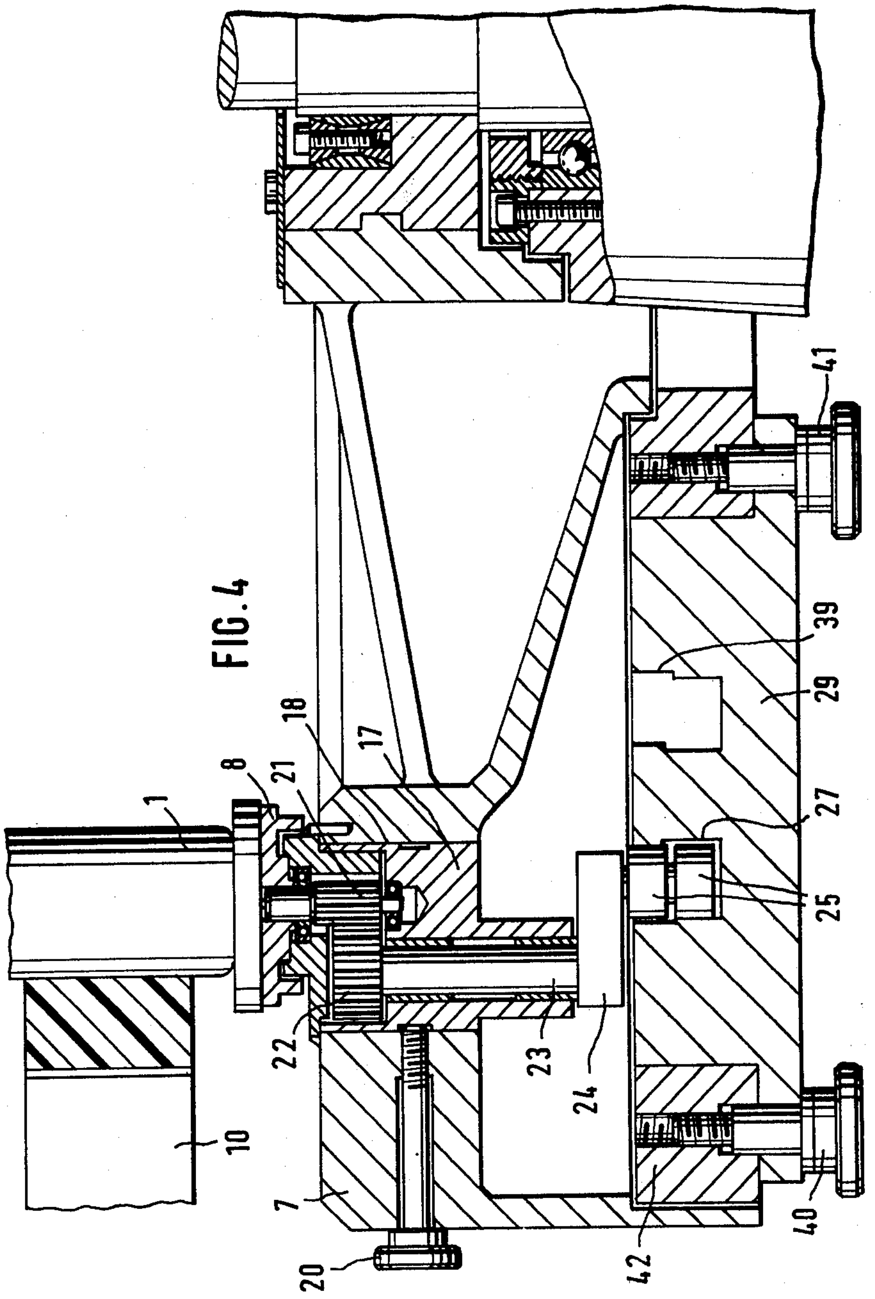
Figure 5:
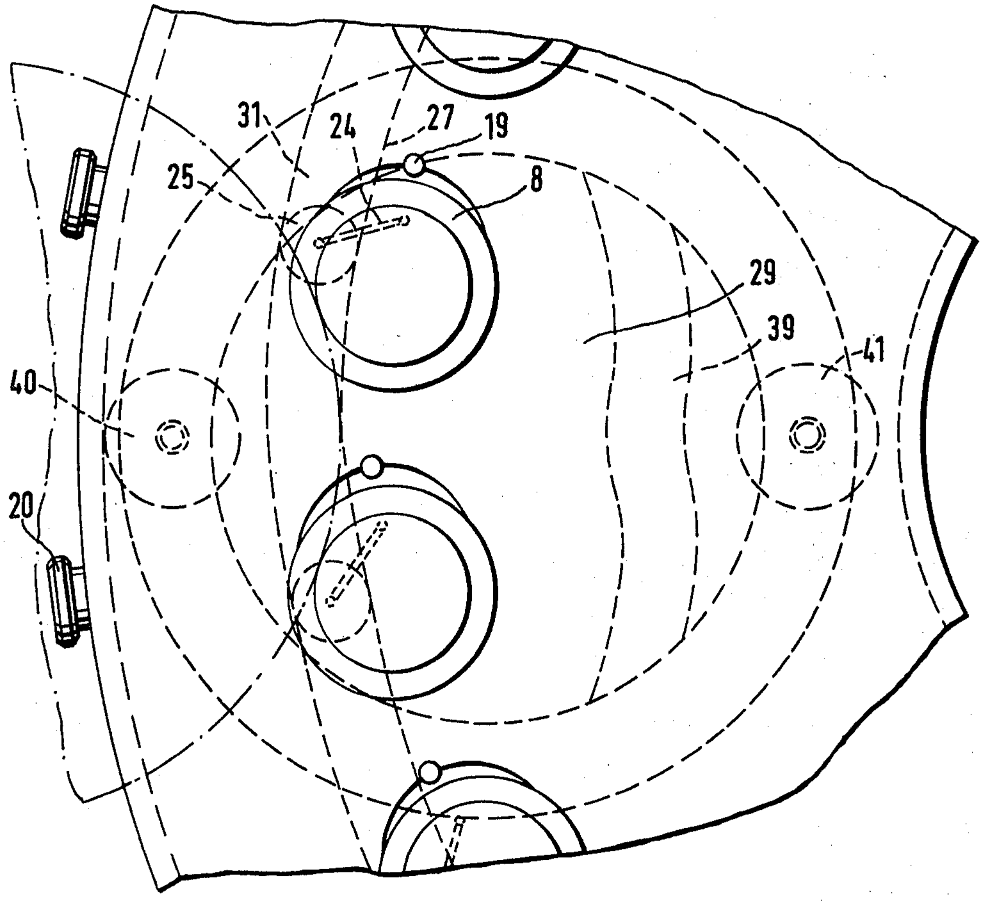
Figure 6:
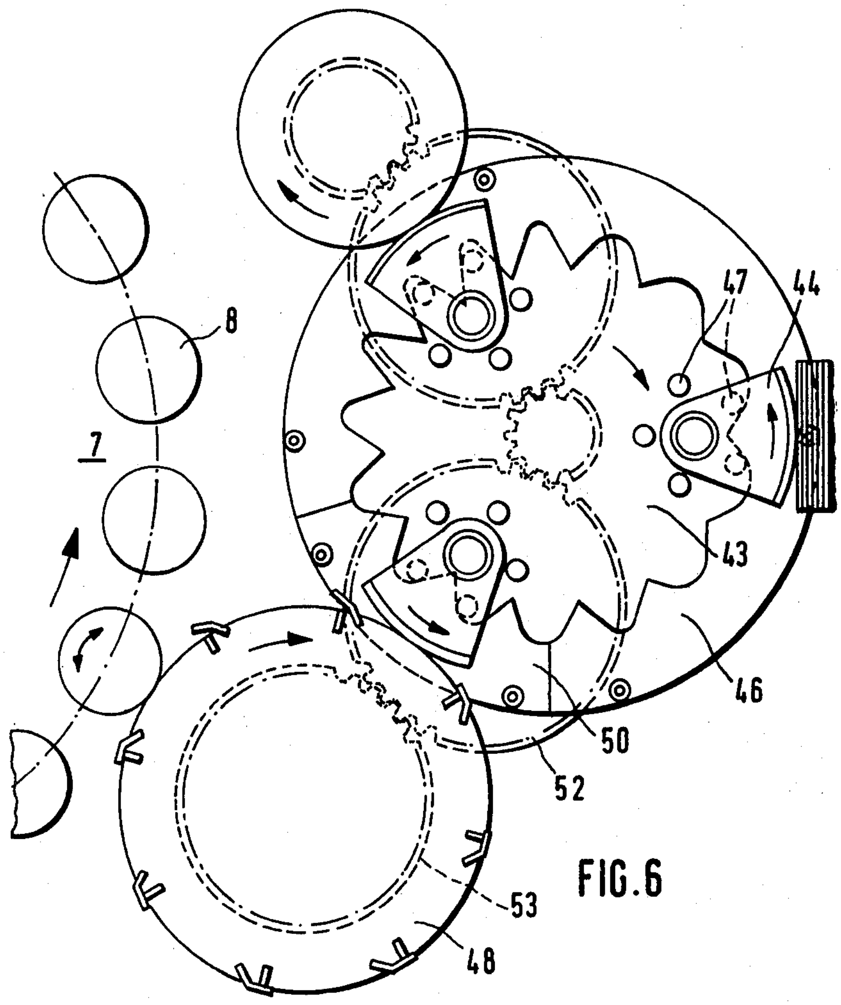
Figure 7:
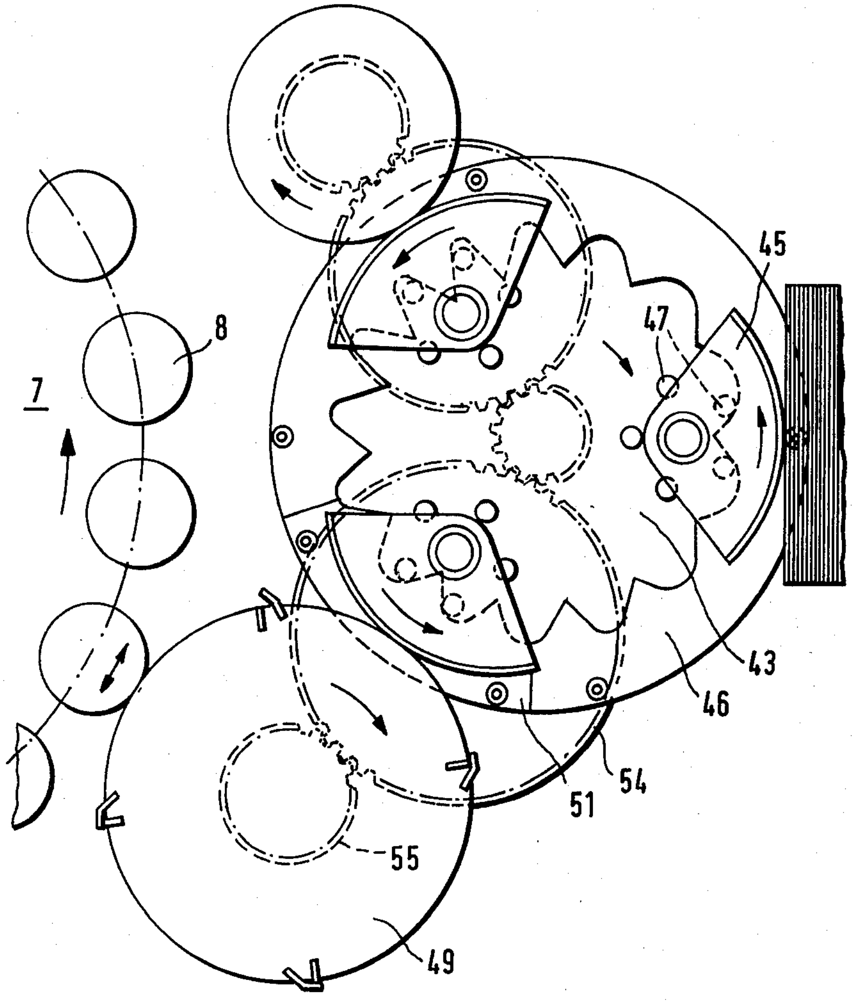

The invention will now be described with reference to the accompanying drawings wherein:

FIG. 1 is a diagrammatic top plan view of a labeling machine having a bottle carrier and two labeling stations, FIG. 2 is an enlarged cross sectional view of half of the bottle carrier of the labeling machine of FIG. 1, FIG. 3 includes FIGS. 3*a* and 3*b* which are a fragmentary top view and a side view of the bottle carrier of FIG. 2, FIG. 4 is an enlarged cross sectional view of half of the bottle carrier of FIG. 1, in an embodiment different from that of FIG. 2, FIG. 5 is a fragmentary top view of the bottle carrier of FIG. 4, FIG. 6 is a top view of a labeling station of the labeling machine of FIG. 1, and FIG. 7 is a top view of a labeling station of FIG. 1 with a gripper cylinder pitch different from that represented in FIG. 6.

In a labeling machine, the unlabeled bottles 1 are spaced out by a spacer screw 3 on a conveyor 2 at intervals corresponding to the pitch of an entry cogwheel 4, so that one bottle 1 is placed by the spacer screw 3 into each outwardly open recess 5. During transport by the spacer screw 3, the bottles are held in place by an outer guide 6. The spacer screw 4 transfers the bottles to a bottle carrier 7 having a plurality of turntables 8 which are disposed at intervals corresponding to the spacing of the entry cogwheel 4. The bottles transferred by the entry cogwheel 4 to the bottle carrier 7 are supported at the bottom by the turntables 8 and are held against rotation by bells, not shown, which are lowered onto the tops of the bottles. A hood bearing the bells is borne by the bell holders 9 and 16. By means to be described in detail below, the bottles can be rotated on their own axes as they are transported by the bottle carrier 7. During such transport they are carried past the gripper cylinder 10 of a first labeling station 11 and past the gripper cylinder 12 of a second labeling station 13, and then they are transferred to an exit cogwheel 14 corresponding to the entry cogwheel 4. The bottles 1 pass from the exit cogwheel to a conveyor 15. During their transport on the bottle carrier 7, the bottles 1 are also moved past various pads, which are not shown, for pressing down the labels applied by the gripper cylinders 10 and 12.

In both of the embodiments shown in FIGS. 2 and 4, the turntable 8 is rotatably mounted in a base 17 which can be installed by lowering it into an opening 18 in the bottle carrier 7, can be located in its rotational position by a pin FIGS. 3 and 5) and can be locked in position axially by means of a set screw 20 FIGS. 4 & 5. On the shaft of the turnable 8 there is mounted a gear 21 which meshes with a corresponding gear 22. The gear 22 is connected by a shaft 23 to a crank 24 on which are mounted the cam followers 25. The cam followers 25 are guided in a cam groove 26 of a displaceable slide 28 in one embodiment (FIG. 2), or in a cam groove 27 of a replaceable cam section 29 in another embodiment (FIG. 4), being guided also in an adjoining fixed cam groove 30 (FIG. 3) in the one case and 31 (FIG. 5) in the other, in the machine frame of the bottle carrier.

In the embodiment represented in FIGS. 2 and 3, the cam section 28 is mounted for displacement radially. For this radial displacement there is provided a linkage which consists of a lever 34 which is fulcrumed at 32 and is connected by a link 33 to the cam section 28; this lever bears a cam follower 35 which follows a cam 36 revolving with the bottle carrier 7. For the connection of the link 33 to the lever arm 34, there is provided an arcuate adjustment slot 37 whose arc is concentric with the point 38 at which the link 33 is attached to the cam section 28.

With this control means a variety of adjustments can be undertaken. If the cam groove 36 is configured such that, whenever the cam followers enter or leave the groove 26 of the cam section 28, the grooves 26 and 30 are in alignment with one another at their junctions, then the groove 26 will be aligned with groove 30 regardless of the point at which the link 33 is attached to lever 34 in the adjustment slot 37. The position of the point of attachment of the link 33 in the adjustment slot 37, however, makes it possible, under the guidance of the cam follower 25 in the groove 26 of the movable cam section 28, to displace the movable cam section radially to a more or less great extent and thus to bring about a more or less great turning of the turntable 8. Therefore, with one and the same cam 36 and one and the same cam groove 26, greater or lesser rotatory movements of the turntable 8 can be preset depending on the point in the control slot 37 at which the link 33 is attached, so that the synchronism can be adjusted in an optimum manner in the case of a change of bottle format.

In the embodiment represented in FIGS. 4 and 5, this adaptation is achieved by replacing the cam section 29. As FIGS. 4 and 5 indicate, a cam groove 39 is formed in addition to cam groove 27 in the cam section 29. The cam section 29 is in the form of a circular plate and is held by means of bolts 40 and 41 in the machine frame 42, which also bears the non-exchangeable cam groove 31.

In the event of a change in the format of the bottles to be labeled, the setscrew 20 is loosened and the base 17 is lifted so that the cam followers 25 come out of the cam groove 27. Then the cam plate 29 is turned, after the screws 40 and 41 have been loosened, so that the cam groove 39 is aligned with the fixed cam groove 31. Then the turntable base 17 with the turntable 8 is lowered again, and the cam followers 25 are inserted into the cam groove 39.

The function of cam plate 29 can also be performed by a drum rather than a turning disk. It is also possible to provide only one cam groove in the cam plate 29, so that it can be replaced, when desired, with a corresponding second cam plate.

At their junctions, the cam grooves 26, 30, 27 and 31 are concentric with the axis of the turntable 8 as shown in FIGS. 3 and 5. This means that, in these transitional areas, the cam followers 24 and 25 do not produce any additional acceleration in the turntable.

The labeling stations represented in FIGS. 6 and 7 are intended for the application of labels of different length while the division or pitch of the bottle carrier remains the same (same distance between bottles). The driving means for the irregular driving of pickup elements 44 and 45 rotatably mounted on a uniformly revolving carrier 43 is a trundle drive comprised of the spur wheel 46 provided with teeth in the form of variously shaped lobes engaging the trundles 47 of a lantern pinion. The spur wheel 46 has in the area of the gripper cylinder 48, 49, an exchangeable section 50, 51. The exchangeable sections 50, 51, produce different irregularities in the individual rotation of the pickup elements 44,45. On account of this different irregularity in the individual rotation of the pickup elements 44, 45, in conjunction with a different transmission ratio achieved by exchanging the gearing 52–53 or 54–55 coupling the carrier 43 with the gripper cylinders 48, 49, it is possible to apply labels of another length so as to utilize all of the label grippers provided on the gripper cylinder 48 or 49. Whereas in the case of the embodiment in FIG. 6, short labels are applied, in the embodiment shown in FIG. 7, long labels are applied. The transfer of the long labels to the bottles 1 without increasing the distance between the bottles in comparison to the distance between bottles in the embodiment in FIG. 6 would lead to difficulties unless, in accordance with the invention, any necessary pattern of rotatory movement could be imparted to the turntables by the cam system. With the invention it is thus possible to apply labels of a different length without changing the division, or pitch, of the bottle carrier, while nevertheless satisfying the requirement of synchronism. For the user of labeling machines this means that, with one and the same machine, a variety of bottle styles can be produced. He need only change a few gears and adjust or exchange the cams.

It will be understood that the specification and examples are illustrative but not limitative of the present invention and that other embodiments within the spirit and scope of the invention will suggest themselves to those skilled in the art.

I claim:

1. In a labeling machine for objects such as bottles, comprising a bottle carrier having turntables for the bottles, a support, a label gripper cylinder with transfer members, drive means coupling the support and the gripper cylinder so as to drive pickup elements successively past a glue roller, label stack and the gripper cylinder and means for rotating each turntable comprising a fixed cam groove cam and cam follower so that during transfer of a label from the gripper cylinder to a bottle there is substantially synchronism between the transfer members of the gripper cylinder and the bottle areas to which the labels are to be applied, the improvement comprising means for readily adjusting the movement of the pickup elements and turntables to handle bottles of different radius and/or labels of different size wherein the fixed cam groove cam in the area of the gripper cylinder includes a cam groove section normally traversed by the cam follower and which is movable with respect to the remainder of the fixed cam groove cam to effect replacement with another cam groove section which is thereafter traversed by the cam follower during use of the machine instead of the first mentioned cam groove section.

2. A labelling machine according to claim 1, wherein the cam groove section has a curvature such that the cam follower does not transmit any force to the turntables.

3. A labeling machine according to claim 1, including a second gripper exchangeable for the first-named gripper cylinder and of different pitch therefrom, the drive means which couples the support of the pickup elements to the gripper cylinder being exchangeable with a second drive means having a different transmission ratio than the first-named drive means, the first and the second drive means each including a cam-controlled irregularity drive having a degree of irregularity, different from the other drive means by exchange of a cam groove section in the area of the gripper cylinder.

4. A labeling machine according to claim 1, including a common support mounted in the machine frame and carrying a plurality of cam groove sections, whereby by turning of the common support one cam groove section is removable from the fixed cam groove and a different cam groove section is insertable into the fixed cam groove.

5. A labeling machine according to claim 4, wherein the common support is in the form of a turnable and a lockable drum or disk.

6. A labeling machine according to claim 1, wherein each turntable with its cam follower is in the form of a unit insertable from above into a bottle carrier.

7. A labeling machine according to claim 1, wherein the cam groove section is displaceable by a control means, the control means including a step-up or step-down drive.

8. A labeling machine according to claim 7, wherein the step-up or step-down drive is adjustable.

9. A labeling machine according to claim 7, wherein the cam groove section is provided with a support connected by means of a coupler to a lever arm at articulation points of different lever arm lengths.

10. A labeling machine according to claim 9, wherein the articulation points of the lever arm lie on an arc about the articulation point of the coupler on the support of the cam groove section.

* * * * *